US008455670B1

(12) United States Patent
O'Lenick

(10) Patent No.: US 8,455,670 B1
(45) Date of Patent: Jun. 4, 2013

(54) MIXED COMPLEX ESTERS

(75) Inventor: Kevin A. O'Lenick, Dacula, GA (US)

(73) Assignee: SuriaTech Corporation, Lawrenceville, GA (US)

( * ) Notice: Subject to any disclaimer, the term of this patent is extended or adjusted under 35 U.S.C. 154(b) by 332 days.

(21) Appl. No.: 12/930,515

(22) Filed: Jan. 10, 2011

Related U.S. Application Data

(60) Provisional application No. 61/459,348, filed on Dec. 13, 2010.

(51) Int. Cl.
*A23D 9/007* (2006.01)

(52) U.S. Cl.
USPC ........... 554/227; 554/224; 554/163; 554/166; 554/172

(58) Field of Classification Search
None
See application file for complete search history.

(56) References Cited

U.S. PATENT DOCUMENTS 5,744,626 A 4/1998 O'Lenick
7,468,208 B2 * 12/2008 Wu et al. ........................ 428/412

* cited by examiner

*Primary Examiner* — Yate K Cutliff

(57) ABSTRACT

The present invention relates to a series of mixed esters of complex esters having two distinct alkyl groups present thereon. One is a low melting product, having a melting point of below 70° C. and the other having a melting point of above. 90° C. The presence of the two different melting point groups on the polyol results in a modification of the hardness, spreadability and aesthetics of the resulting mixed ester. This ability to alter hardness and skin aesthetics makes the products of the present invention useful in personal care products ranging as additives to pigmented products to minimize syneresis, to stick products alter the hardness, shrinkability and aesthetics of the stick, to pressed powders where they act to modify the compressibility of the powders to which they are added as well as the feel achieved when they are applied to the skin.

15 Claims, No Drawings

MIXED COMPLEX ESTERS

RELATED APPLICATION

This application claims priority to and benefit of U.S. Provisional Application Nos. 61/459,348, filed Dec. 13, 2010, the disclosures of each of which are incorporated herein for all purposes.

FIELD OF THE INVENTION

The present invention relates to a series of mixed esters of complex esters having two distinct alkyl groups present thereon. One is a low melting product, having a melting point of below 70° C. and the other having a melting point of above 90° C. The presence of the two different melting point groups on the polyol results in a modification of the hardness, spreadability and aesthetics of the resulting mixed ester. The polyols of interest in making the complex esters are pentaertithitol, dipentaerythritol and trimethylol propane. Esters of these materials are referred to as complex esters.

The ability to alter hardness and skin aesthetics makes the products of the present invention useful in personal care products ranging as additives to pigmented products to minimize syneresis, to stick products alter the hardness, shrinkability and aesthetics of the stick, to pressed powders where they act to modify the compressibility of the powders to which they are added as well as the feel achieved when they are applied to the skin.

The placement of these groups in the same molecule as will become clear from reading the specification of this invention, results in a unique ability to alter a combination of properties, including hardness, geology and skin aesthetics. It is very important to note that each of the hydroxyl groups on the polyol are randomly either have a high melting or low melting group thereon. This is a direct consequence of the fact that from a reactivity point of view each hydroxyl group is as reactive as each other on the polyol (no regiospecificity) and each carboxyl on each acid is equally reactive, resulting in a totally random ester. This is the exact opposite of what happens in nature, where each group is carefully controlled using enzyme systems possessed by the living plant or animal making such esters biologically.

BACKGROUND OF THE INVENTION

Complex esters are a widely known class of compounds. These materials are esters that are the reaction product of polyhydroxy alcohols (like pentaerythritol, dipentaerythritol, trimethylolpropane and the like) reacted with a mono-acid. These materials are not polyesters, but rather complex esters in that there are several ester groups on anon-polymeric backbone.

U.S. Pat. No. 5,744,626 to O'Lenick teaches "The present invention deals with novel, highly branched complex esters. The compounds are complex esters of multi hydroxy compounds like pentaerythritol reacted with guerbet acids. The introduction of the regiospecific branched guerbet acid portion of the molecule into the compounds of the present invention results in improved liquidity and mold release in polycarbonate applications. As will become clear, we refer to the esters of the present invention as complex esters since the hydroxy compound used in the synthesis contains several hydroxyl groups, placed close to each other, resulting in branching in the ester, and the guerbet acid is itself branched in a very regiospecific beta branch.

U.S. Pat. No. 6,160,144 is directed to trimethylol propane esters that are fatty acid mixtures with an oleic acid content of 85 wt % and a stearic acid content of 0.5 to 2.5 wt %, both relative to the mixture, b) alcohols and c) as desired, polyfunctional carboxylic acids. The invention also relates to hydraulic oils based on these esters, and to the use of the esters as lubricants, as hydraulic oils and in cosmetics.

U.S. Pat. No. 5,486,302 teaches "A lubricant composition of suitable viscosity miscible non-chlorinated, fluorinated hydrocarbon refrigerants includes polyhydric alcohol esters, such as TMP, mono and/or di-pentaerythritol esters, made with branched carboxylic acids." None of these references either anticipate not make obvious the esters of the present invention.

Until the compounds of the present invention, complex esters that contain both high melting groups (not naturally occurring) and lower melting point groups in the same molecule. The placement of these groups in the same molecule as will become clear from reading the specification of this invention, results in a unique ability to alter a combination of properties, including hardness, rehology and skin aesthetics. It is very important to note that each of the hydroxyl groups on the polyol are randomly either have a high melting or low melting group thereon. This is a direct consequence of the fact that from a reactivity point of view each hydroxyl group is as reactive as each other on the polyol (no regiospecificity) and each carboxyl on each acid is equally reactive, resulting in a totally random complex ester. This is the exact opposite of what happens in nature, where each group is carefully controlled using enzyme systems possessed by the living plant or animal making such esters biologically. This random pattern is critical to the functionality making the resulting mixed ester very unlikely to form highly organized crystalline waxes, rather forming amphorous solids and butter like products. We have determined that the difference in melting point of at least 20° C. is a critical factor in the present invention. When the range of melt point is this far apart (i.e. the difference between the high melting point acid and the low melting point acid,) the resulting product has a softness that confers a butter like consistency. Without wanting to be held to one particular explanation, we believe that when the difference is that great a fractional solidification occurs upon cooling resulting in an appreciable amount of time where there are both solid and liquid domains in the cooling wax. This lack of uniformity results in the "disrupted wax" being formed. In a preferred embodiment, the lower melting acid is liquid at ambient temperature and never becomes solid under ambient temperatures, which is the temperature of application for personal care products.

Until the compounds of the present invention, complex esters that contain both high melting groups (not naturally occurring) and lower melting point groups in the same molecule. The placement of these groups in the same molecule as will become clear from reading the specification of this invention, results in a unique ability to alter a combination of properties, including hardness, rehology and skin aesthetics.

THE INVENTION

Objective of the Invention

It is the object of the present invention to provide a series of complex esters that are made by the esterification of pentaerythritol, dipenterythritol, trimethylol propane or mixtures thereof with a mixture of carboxylic acids having a melt point above 90° C. and fatty acids having a melt point below 70° C.

It is additionally an object of the invention to provide a process for using the esters of the present invention in a process for conditioning hair and skin which comprises contacting the hair or skin with a complex ester that was made by the esterification of specific polyol compounds selected from the group consisting of pentaerythritol, dipenterythritol, trimethylol propane or mixtures thereof with a mixture of carboxylic acids having a melt point above 90° C. and fatty acids having a melt point below 70° C.

All temperatures are given in degrees centigrade, all percentages in percent by weight. All patents referenced herein are incorporated by reference.

SUMMARY OF THE INVENTION

The present invention is drawn to a series of complex esters that are made by the esterification of specific polyols with a mixture of carboxylic acids having a melt point above 90° C. and fatty acids having a melt point below 70° C.

Additionally, the invention is drawn to a process for using the esters of the present invention in a process for conditioning hair and skin which comprises contacting the hair or skin with a complex ester that was made by the esterification of pentaerythritol, dipenterythritol, trimethylol propane or mixtures thereof with a mixture of carboxylic acids having a melt point above 90° C. and fatty acids having a melt point below 70° C.

DETAILED DESCRIPTION OF THE INVENTION

One aspect of the present invention is a mixed complex ester made by the esterification reaction of (A) a polyol selected from the group consisting of (i) Pentaerythritol, conforming to the following structure:

$C—(CH_2OH)_4$ (ii) dipenterythritol, $(HOCH_2)_3—C—CH_2OCH_2—C—(CH_2OH)_3$ (iii) trimethylol propane $CH_3CH_2—C—(CH_2OH)_3$ (iv) or mixtures thereof and (B) a mixture of 1) a fatty acid having a melting point of below 70° C. conforming to the following structure:

$R^1C(O)OH$ wherein $R^1$ is alkyl or alkylene having 6 to 18 carbon atoms;

2) a fatty acid having a melting point of above 90° C. conforming to the following structure:

$R^2C(O)OH$ wherein $R^2$ is alkyl having 30 to 60 carbon atoms.

The two types of fatty acids are mixed together with pentaerythritol, dipenterythritol, trimethylol propane or mixtures thereof and heated to between 150 and 200° C., preferably between 160 and 180° C. for 4 to 10 hours while water is distilled off. Since there is no specificity of reaction of the three hydroxyl groups with either of the fatty acids reacted a truly mixed complex ester results.

The present invention is drawn to a series of complex esters that conform to the following structures;

(i) $C—(CH_2(CH_2OC(O)R)_4$, (ii) $(RC(O)OCH_2)_3—C—CH_2—O—CH_2—C—(CH_2OC(O)R)_3$, (iii) $CH_3CH_2—C—(CH_2OC(O)R)_3$, (iv) or mixtures thereof wherein R is a mixture of (a) a lower carbon alkyl or alkylene having 5 to 17 carbon atoms; and (b) a higher carbon alkyl having between 29 and 59 carbon atoms.

The presence of two different melt point carboxylic acids in the same molecule, allows one to make a high melting point solid that has domains of lowering melting groups that inhibit formation of crystalline hard waxes. The disruption caused by the different melting point groups prevents the material from solidifying uniformly and gives products with unique rehology and feel properties on the skin.

The products with less than 50% of the total carboxylic groups added that have a high melting point are softer, more thixotrophic and spread better on the skin. A preferred concentration of 1 to 2 parts of the high melting carboxylic acid the low melting products provide great skin feel. A more preferred concentration of 1 to 5 parts of the high melting carboxylic acid the low melting products provide products that liquefy under pressure.

The products with more than 50% of the total carboxylic groups added that have a high melting point are harder, more waterproof on the skin and provide stick hardness to lipsticks and antiperspirant compositions.

Preferred Embodiment

In a preferred embodiment pentaerythritol,

In a preferred embodiment dipenterythritol,

In a preferred embodiment trimethylolpropane.

In a preferred embodiment mixtures of pentaerythritol, dipentaerythritol.

trimethyolpropane.

In a preferred embodiment the ratio of high melting group fatty acid with a higher carbon alkyl having between 49 and 59 carbon atoms to low melting group fatty acid with a lower carbon alkyl or alkylene group having 5 to 17 carbon atoms is 1:1 by weight.

In a preferred embodiment the ratio of high melting group fatty acid with a higher carbon alkyl having between 49 and 59 carbon atoms to low melting group fatty acid with a lower carbon alkyl or alkylene group having 5 to 17 carbon atoms is 2:1 by weight.

In a preferred embodiment the ratio of high melting group fatty acid with a higher carbon alkyl having between 49 and 59 carbon atoms to low melting group fatty acid with a lower carbon alkyl or alkylene group having 5 to 17 carbon atoms is 1:2 by weight.

In a preferred embodiment the ratio of high melting group fatty acid with a higher carbon alkyl having between 49 and 59 carbon atoms to low melting group fatty acid with a lower carbon alkyl or alkylene group having 5 to 17 carbon atoms is 1:5 by weight.

In a preferred embodiment the ratio of high melting group fatty acid with a higher carbon alkyl having between 49 and 59 carbon atoms to low melting group fatty acid with a lower carbon alkyl or alkylene group having 5 to 17 carbon atoms is 5:1 by weight.

In a preferred embodiment the ratio of high melting group fatty acid with a higher carbon alkyl having between 49 and 59 carbon atoms to low melting group fatty acid with a lower carbon alkyl or alkylene group having 5 to 17 carbon atoms is 10:1 by weight.

In a preferred embodiment the ratio of high melting group fatty acid with a higher carbon alkyl having between 49 and 59 carbon atoms to low melting group fatty acid with a lower carbon alkyl or alkylene group having 5 to 17 carbon atoms is 1:10 by weight.

Examples

Polyols

Pentaerythritol,

Pentaerythritol is an item of commerce having a CAS number of 115-77-5. It conforms to the following structure:

'C—$(CH_2OH)_4$

Dipentaerythritol,

Dipentaerythritol is an item of commerce having a CAS number of 126-58-9 and an EINECS number of 204-794-1, it conforms to the following structure:

'$(HOCH_2)_3$—C—$CH_2O$—$CH_2$—C—$(CH_2OH)_3$

Trimethylolpropane

Trimethylolpropane is an item of commerce having a CAS number of 77-99-6, it conforms to the following structure:

$CH_3CH_2$—C—$(CH_2OH)_3$

Fatty Acids

A Melt Point Above 90° C.

| Example | Carbon Atoms | Acid Value | Commercial Name | Melt Point (° C.) |
|---|---|---|---|---|
| 1 | C29 | 120 | Unicid 350 | 92 |
| 2 | C49 | 79 | Unicid 550 | 101 |
| 3 | C59 | 63 | Unicid 750 | 110 |

Unicid is a registered trademark of Baker Petrolite. The molecular weight for reaction purposes was calculated as from the acid value. The trade name is given merely for reference.

B Melt Point Below 70° C.

| Example | Carbon Atoms | Name | Melt Point (° C.) |
|---|---|---|---|
| 4 | C7 | Capric Acid | −3 |
| 5 | C9 | Caprylic Acid | 16 |
| 6 | C11 | Lauric Acid | 44 |
| 7 | C13 | Myristic Acid | 55 |
| 8 | C15 | Palmitic Acid | 63 |
| 9 | C17 | iso-stearic Acid | −30 |
| 10 | C17 (one unsaturation) | Oleic Acid | 16 |
| 11 | C17 (two unsaturation) | Linoleic Acid | −5 |

Trimethylolpropane Mixed Complex Esters

General Procedure

The esters of the current invention are made as follows To a glass flask having a thermometer, stirring and vacuum is added 134 grams of trimethylolpropane . . . . Next add the carboxylic acid having a melt point above 85° C. (examples 1-3), next add the fatty acids (example 4-11). Finally, add 0.1 percent by weight of stannousoxylate (based upon the total weight of other ingredients added. Heat to 180° C. Water will begin to distill off as the temperature reaches around 150 C. Hold the temperature at 180-190 C until the acid value is less than 5 mg KOH/gm.

| | Carboxylic Acid (Example 1-3) | | Fatty Acid (Example 4-11) | |
|---|---|---|---|---|
| Example | Example | Grams | Example | Grams |
| 12 | 1 | 700 | 4 | 216 |
| 13 | 2 | 1065 | 5 | 300 |
| 14 | 3 | 1335 | 6 | 342 |
| 15 | 1 | 700 | 7 | 382 |
| 16 | 2 | 1065 | 8 | 426 |
| 17 | 3 | 1335 | 9 | 426 |
| 18 | 1 | 700 | 10 | 423 |
| 19 | 2 | 1065 | 11 | 420 |
| 20 | 3 | 890 | 4 | 288 |
| 21 | 1 | 467 | 5 | 344 |
| 22 | 2 | 710 | 6 | 400 |
| 23 | 3 | 890 | 7 | 456 |
| 24 | 1 | 467 | 8 | 512 |
| 25 | 2 | 710 | 9 | 568 |
| 26 | 3 | 890 | 10 | 564 |
| 27 | 1 | 172 | 11 | 560 |
| 28 | 1 | 934 | 4 | 144 |
| 29 | 2 | 1420 | 5 | 172 |
| 30 | 3 | 1780 | 6 | 200 |
| 31 | 1 | 934 | 7 | 228 |
| 32 | 2 | 1420 | 8 | 256 |
| 33 | 3 | 1780 | 9 | 284 |
| 34 | 1 | 934 | 10 | 282 |
| 35 | 2 | 1420 | 11 | 280 |

Pentaerythritol Mixed Complex Esters

General Procedure

The esters of the current invention are made as follows

To a glass flask having a thermometer, stirring and vacuum is added 102 grams of pentaerythritol . . . . Next add the carboxylic acid having a melt point above 85° C. (examples 1-3), next add the fatty acids (example 4-11). Finally, add 0.1 percent by weight of stannous oxylate (based upon the total weight of other ingredients added. Heat to 180° C. Water will begin to distill off as the temperature reaches around 150 C. Hold the temperature at 180-190 C until the acid value is less than 5 mg KOH/gm.

| | Carboxylic Acid (Example 1-3) | | Fatty Acid (Example 4-11) | |
|---|---|---|---|---|
| Example | Example | Grams | Example | Grams |
| 12 | 1 | 700 | 4 | 216 |
| 13 | 2 | 1065 | 5 | 300 |
| 14 | 3 | 1335 | 6 | 342 |
| 15 | 1 | 700 | 7 | 382 |
| 16 | 2 | 1065 | 8 | 426 |
| 17 | 3 | 1335 | 9 | 426 |
| 18 | 1 | 700 | 10 | 423 |
| 19 | 2 | 1065 | 11 | 420 |
| 20 | 3 | 890 | 4 | 288 |
| 21 | 1 | 467 | 5 | 344 |
| 22 | 2 | 710 | 6 | 400 |
| 23 | 3 | 890 | 7 | 456 |
| 24 | 1 | 467 | 8 | 512 |
| 25 | 2 | 710 | 9 | 568 |
| 26 | 3 | 890 | 10 | 564 |
| 27 | 1 | 172 | 11 | 560 |
| 28 | 1 | 934 | 4 | 144 |
| 29 | 2 | 1420 | 5 | 172 |
| 30 | 3 | 1780 | 6 | 200 |
| 31 | 1 | 934 | 7 | 228 |
| 32 | 2 | 1420 | 8 | 256 |
| 33 | 3 | 1780 | 9 | 284 |
| 34 | 1 | 934 | 10 | 282 |
| 35 | 2 | 1420 | 11 | 280 |

Dipentaerythritol Mixed Complex Esters

General Procedure

The esters of the current invention are made as follows

To a glass flask having a thermometer, stirring and vacuum is added 127 grams of dipentaerythritol . . . . Next add the carboxylic acid having a melt point above 85° C. (examples 1-3), next add the fatty acids (example 4-11). Finally, add 0.1 percent by weight of stannous oxylate (based upon the total weight of other ingredients added. Heat to 180° C. Water will begin to distill off as the temperature reaches around 150 C. Hold the temperature at 180-190 C until the acid value is less than 5 mg KOH/gm.

| | Carboxylic Acid (Example 1-3) | | Fatty Acid (Example 4-11) | |
|---|---|---|---|---|
| Example | Example | Grams | Example | Grams |
| 12 | 1 | 700 | 4 | 216 |
| 13 | 2 | 1065 | 5 | 300 |
| 14 | 3 | 1335 | 6 | 342 |
| 15 | 1 | 700 | 7 | 382 |
| 16 | 2 | 1065 | 8 | 426 |
| 17 | 3 | 1335 | 9 | 426 |
| 18 | 1 | 700 | 10 | 423 |
| 19 | 2 | 1065 | 11 | 420 |
| 20 | 3 | 890 | 4 | 288 |
| 21 | 1 | 467 | 5 | 344 |
| 22 | 2 | 710 | 6 | 400 |
| 23 | 3 | 890 | 7 | 456 |
| 24 | 1 | 467 | 8 | 512 |
| 25 | 2 | 710 | 9 | 568 |
| 26 | 3 | 890 | 10 | 564 |
| 27 | 1 | 172 | 11 | 560 |
| 28 | 1 | 934 | 4 | 144 |
| 29 | 2 | 1420 | 5 | 172 |
| 30 | 3 | 1780 | 6 | 200 |
| 31 | 1 | 934 | 7 | 228 |
| 32 | 2 | 1420 | 8 | 256 |
| 33 | 3 | 1780 | 9 | 284 |
| 34 | 1 | 934 | 10 | 282 |
| 35 | 2 | 1420 | 11 | 280 |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

The invention claimed is:

1. A complex ester conforming to the following structure;

(i) $C—(CH_2OC(O)R)_4$;

(ii) $(RC(O)OCH_2)_3—C—CH_2—O—CH_2—C—(CH_2OC(O)R)_3$;

(iii) $CH_3CH_2—C—(CH_2OC(O)R)_3$;

(iv) or mixtures thereof wherein

R is a mixture of (a) a lower carbon containing alkyl or alkylene group having 5 to 17 carbon atoms; and (b) a higher carbon containing alkyl having between 29 and 59 carbon atoms.

2. A complex ester of claim 1 conforming to the following structure;

$C—(CH_2OC(O)R)_4$ wherein

R is a mixture of (a) a lower carbon containing alkyl or alkylene group having 5 to 17 carbon atoms; and (b) a higher carbon containing alkyl having between 29 and 59 carbon atoms.

3. A complex ester of claim 1 conforming to the following structure;

$(RC(O)OCH_2)_3—C—CH_2—O—CH_2—C—(CH_2OC(O)R)_3$ wherein

R is a mixture of (a) a lower carbon containing alkyl or alkylene group having 5 to 17 carbon atoms; and (b) a higher carbon containing alkyl having between 29 and 59 carbon atoms.

4. A complex ester of claim 1 conforming to the following structure;

$CH_3CH_2—C—(CH_2OC(O)R)_3$;

wherein

R is a mixture of (a) a lower carbon containing alkyl or alkylene group having 5 to 17 carbon atoms; and (b) a higher carbon containing alkyl having between 29 and 59 carbon atoms.

5. A complex ester of claim 1 conforming to the following structure;

A mixture of (i) $C—(CH_2OC(O)R)_4$;

(ii) $(RC(O)OCH_2)_3—C—CH_2—O—CH_2—C—(CH_2OC(O)R)_3$;

(iii) $CH_3CH_2—C—(CH_2OC(O)R)_3$;

wherein

R is a mixture of (a) a lower carbon containing alkyl or alkylene group having 5 to 17 carbon atoms; and (b) a higher carbon containing alkyl having between 29 and 59 carbon atoms.

6. A complex ester of claim 1 wherein the higher carbon alkyl containing group has 29 carbon atoms.

7. A complex ester of claim 1 wherein the higher carbon alkyl containing group has 49 carbon atoms.

8. A complex ester of claim 1 wherein the higher carbon alkyl containing group has 59 carbon atoms.

9. A complex ester of claim 1 wherein the ratio of higher carbon alkyl containing group having high melting fatty acid to a lower carbon alkyl or alkylene group having low melting fatty acid is 1:1 by weight.

10. A complex ester of claim 1 wherein the ratio of higher carbon alkyl containing group having high melting fatty acid to a lower carbon alkyl or alkylene group having low melting fatty acid is 2:1 by weight.

11. A complex ester of claim 1 wherein the ratio of higher carbon alkyl containing group having high melting fatty acid to a lower carbon alkyl or alkylene group having low melting fatty acid is 1:2 by weight.

12. A complex ester of claim 1 wherein the ratio of higher carbon alkyl containing group having high melting fatty acid to a lower carbon alkyl or alkylene group having low melting fatty acid is 1:5 by weight.

13. A complex ester of claim 1 wherein the ratio of higher carbon alkyl containing group having high melting fatty acid to a lower carbon alkyl or alkylene group having low melting fatty acid is 5:1 by weight.

14. A complex ester of claim 1 wherein the ratio of higher carbon alkyl containing group having high melting fatty acid to a lower carbon alkyl or alkylene group having low melting fatty acid is 10:1 by weight.

15. A complex ester of claim 1 wherein the ratio of higher carbon alkyl containing group having high melting fatty acid to a lower carbon alkyl or alkylene group having low melting fatty acid is 10:1 by weight.

* * * * *